INVENTOR
BENGT MARTIN SÖDERGÅND
BY
Jennings Bailey J

United States Patent Office 3,574,059
Patented Apr. 6, 1971

3,574,059
CONTROL ROD ARRANGEMENT FOR LIGHT WATER NUCLEAR REACTORS
Bengt Martin Södergård, Vasteras, Sweden, assignor to Allmanna Svenska Elektriska Aktiebolaget, Vasteras, Sweden
Filed Feb. 29, 1968, Ser. No. 709,419
Claims priority, application Sweden, Mar. 3, 1967, 3,002/67
Int. Cl. G21c 7/10
U.S. Cl. 176—86　　　　　　　　　　　　　　　4 Claims

ABSTRACT OF THE DISCLOSURE

In a light water reactor, a control rod is of cruciform cross-section and runs in a cruciform gap between fuel assemblies arranged in a square, and in a guide tube arranged below the fuel assembly. The guide tube has a somewhat greater diameter than the span of the control rod across the cruciform section. The control rod is joined to an operating device arranged under the guide tube. At the lower end of the control rods the points of the control rod cross are provided with guide plates rounded off at the points facing the guide tube. The guide plates may consist of graphite or be coated on the surface facing the guide tube with a hard material such as stellite. The rounding off of the guide plates has a slightly smaller radius of curvature than the guide tube.

BACKGROUND OF THE INVENTION (1) Field of the invention

The invention relates to control rods for light water nuclear reactors.

(2) The prior art

For so-called light water reactors it is known to use control rods having cruciform cross section and running in the cruciform gap between fuel assemblies arranged in a square. Particularly with light water reactors, due to the cramped space above the reactor core, it is not suitable to withdraw the control rods upwardly out of the reactor. However, there is room under the reactor and during operation the lower ends of the control rods therefore run in a guide tube arranged below the fuel assemblies. The guide tube has a somewhat greater diameter than the span of the control rod cross. Below the guide tube is an operating device for the control rod which is connected to the control rod by means of a rod.

When the control rods are in their lowest position or in rather low positions, the rod of the driving means prevents the control rods from touching the guide tube. In the higher positions of the control rods there is a risk that they will rest against the guide tube due to the fact that during manufacture the driving device may not be correctly directed, which might also happen with the operating rod, of course. The clearance between the guide tube and control rod cannot be so great that there is no risk of them coming into contact. The space available is insufficient for such a safety precaution. On the other hand the contact force will be limited since the operating rod is normally rather easily bent. However, the control rods are in motion for only a fractional part of the operating time of the reactor and the wear on the contact point due to the vertical movement of the control rod is of secondary importance. Of primary importance is the wear which may occur at the contact point between control rod and guide tube due to the guide tube vibrating and the contact surfaces being displaced against each other with a frequency of about 30 c.p.s. and an amplitude of the order of magnitude 1/1000 to 1/10 mm. These vibrations are maintained, among other things, by a relatively high water speed (3 m./sec.) on the outside of the guide tube.

SUMMARY OF THE INVENTION

The control rod has absorber blades containing boron carbide in tubes or drilled holes, well sealed so that water cannot penetrate. Contact between the absorber blades and guide tube, however, might result in the pressure-tight enclosure of boron carbide being punctured. According to the invention this is avoided by providing the free arm ends of the control rod cross at the lower ends of the absorber blades with guide plates substantially parallel to the inner surface of the guide tube.

To prevent the control rod guide plate from wearing a hole in the guide tube it is made with a slightly smaller radius of curvature than the guide tube and is furthermore manufactured from a suitable material such as graphite. It is also possible to harden the surface of the guide plate facing the guide tube by coating this surface with suitable material, for example stellite. It should also be noted that the water flowing inside the guide tube itself forms a damping cushion in the narrow gap between guide plate and guide tube. This also contributes to reducing the wear between them.

BRIEF DESCRIPTION OF THE DRAWINGS

The invention is best understood with reference to the accompanying FIGS. 1 and 2 which show one embodiment of the invention.

DESCRIPTION OF THE PREFERRED EMBODIMENTS

Figure 1:
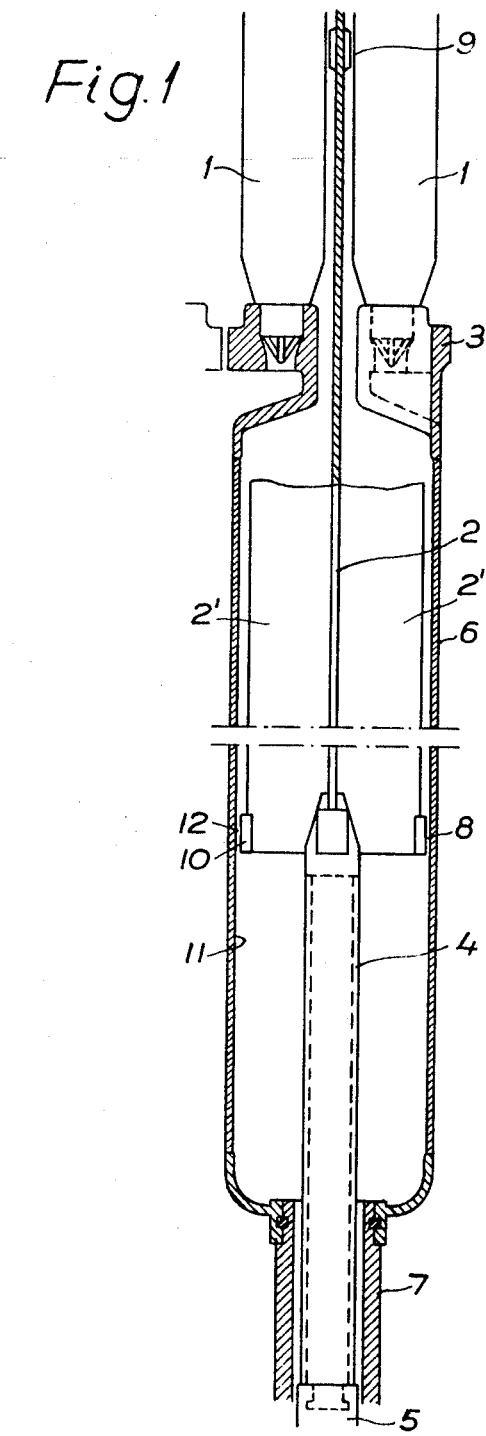

In FIG. 1 is shown how the cruciform control rod 2 can be pushed up between the fuel assemblies 1. The fuel assemblies 1 rest at the core bottom on an assembly plate 3. The control rod 2 comprises four identical elongated absorber blades 2 and is provided at the bottom with a shaft 4 which is connected by a bayonet coupling to a driving rod 5. This driving rod 5 is in turn connected to an operating device, not shown. The control rod 2 can be drawn into a guide tube 6. When the control rod is in its lower position, that is completely drawn into the guide tube 6, the outer edges of the control rod absorber blades are prevented from coming into contact with the guide tube since the shaft 4 of the control rod, which runs in an outer tube 7, holds the lower end of the control rod fairly rigid. The further up the control rod 2 is pushed the worse will be this rigidity, partly due to the fact that the shaft 4 of the control rod and the rod 5 of the driving means may not be true and partly due to the fact that they are also rather easily bent. It is for this reason that the lower guide plates are arranged at the lower ends of the absorber blades 2′ and at right angles to the free arm ends 2″ of the control rod cross. In certain cases the upper ends of the control rods may also be provided with special guide surfaces 9, as seen in FIG. 1. The guide plates 8 have plate surfaces 10 facing the inner surface 11 of the guide tube 6 and being substantially parallel thereto. Between the guide tube 6 and the guide plates 8 there are narrow water gaps 12, and in the water gaps damping water cushions are formed by water flowing inside the guide tube 6.

Figure 2:
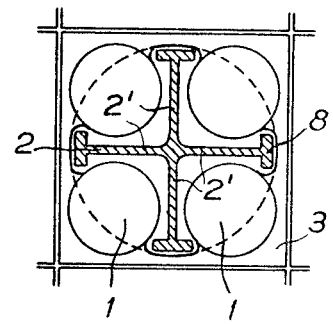

FIG. 2 shows the lower guide plates 8 of the control rods when passing through the assembly plate 3. As before the control rod is generally designated by the numeral 2 and the fuel assemblies by the numeral 1.

Figure 3:
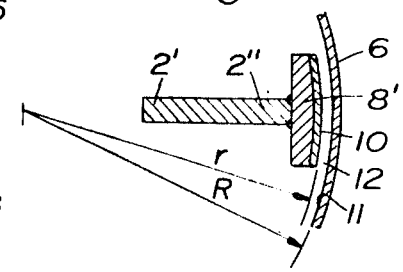
FIGS. 3 and 4 show different embodiments of a detail in FIG. 2.
Figure 4:
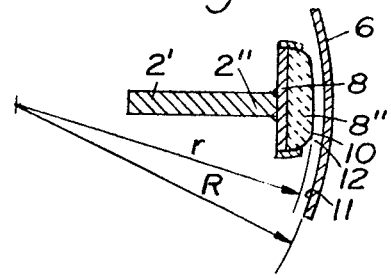

As shown in FIGS. 3 and 4, the guide surfaces 10 or guide plates 8 have a somewhat smaller radius of curvature (radius $r$) than the guide tube itself (radius $R$). In FIG. 3 is shown a guide plate 8 having a coat 8′ of a hard material such as stellite, and in FIG. 4 is shown a guide plate 8 having a wearing pad 8" of graphite. Despite all suitable precautions, however, damage occurs from time to time and the control rod must be able to be removed from the reactor. In the present case this is most easily carried out by first removing the fuel assemblies 1 surrounding the control rod, after which it is possible in the upper position of the control rod to turn the control rod with a suitable tool so that the bayonet coupling between the shaft 4 of the control rod and the rod 5 of the driving means is disengaged and the control rod 2 can then be lifted out of the reactor with the help of the tool.

What is claimed is:

1. In a nuclear reactor, the combination of a control rod of cruciform cross-section insertable into a cruciform gap between fuel assemblies arranged in a square and withdrawable into a guide tube arranged below the fuel assemblies, said guide tube having a somewhat greater diameter than the span of said control rod cross, said cross having four arms, each arm having a free end, and said control rod comprising absorber blades having lower ends, wherein the improvement comprises at least one guide plate attached to each of said lower ends of said absorber blades and extending substantially at right angles to each of said free arm ends, each of said guide plates being at least as twice as wide as the thickness of said absorber blades, each of said guide plates having a plate surface facing an inner surface of said guide tube and being substantially parallel thereto, forming a narrow water gap between said guide tube and each of said guide plates and providing a damping water cushion in said gap, said guide plates preventing wear on said lower ends of said absorber blades, and said water cushion preventing said guide plates from puncturing said guide tube.

2. The combination of claim 1, wherein the radius of curvature of each guide plate surface is slightly smaller than that of said guide tube surface.

3. The combination of claim 1, wherein said guide plates consists essentially of graphite.

4. The combination of claim 1, wherein at least one of said guideplate surfaces has a coating of material having a high degree of hardness.

References Cited

UNITED STATES PATENTS

| 3,020,888 | 2/1962 | Braun | 176—36UX |
|---|---|---|---|
| 3,407,117 | 10/1968 | Lichtenberger | 176—86 |
| 3,020,887 | 2/1962 | Hobson et al. | 176—36 |
| 3,198,709 | 8/1965 | Macomber | 176—35 |
| 3,120,480 | 2/1964 | Ledin | 176—36 |
| 3,332,850 | 7/1967 | Jonsson et al. | 176—86 |
| 3,335,064 | 8/1967 | Whittaker et al. | 176—86 |

FOREIGN PATENTS

| 1,435,217 | 3/1966 | France | 176—86 |
|---|---|---|---|

OTHER REFERENCES

BAW-147, 1960, pp. 3, 5, 6, 11, and Fig. 2.
MND-M-1853 (ADD 1), 1961, pp. III-9, III-23, III-24, III-26, III-27, III-28, III-30, III-31, III-32.

CARL D. QUARFORTH, Primary Examiner

H. E. BEHREND, Assistant Examiner